United States Patent Office 2,880,217
Patented Mar. 31, 1959

2,880,217

Δ$^{1,4}$ PREGNADIENE-11α,20β-DIOL-3-ONE

Richard W. Thoma, Somerville, and Josef Fried, New Brunswick, N.J., assignors to Olin Mathieson Chemical Corporation, New York, N.Y., a corporation of Virginia No Drawing. Application April 6, 1956
Serial No. 576,543

1 Claim. (Cl. 260—397.45)

This invention relates to, and has for its object, the provision of the new steroid, Δ$^{1,4}$-pregnadiene-11α,20β-diol-3-one. This steroid is prepared by subjecting 11α-hydroxyprogesterone to the action of enzymes of the microorganism *Corynebacterium simplex* under aerobic conditions. This change (oxidation of one part accompanied by reduction of another part of the molecule) can best be effected by either including the steroid in an aerobic culture of the microorganism, or by bringing together, in an aqueous medium, the steroid, air and enzymes of non-proliferating cells of the microorganism.

In general, the conditions of culturing *Corynebacterium simplex* for the purposes of this invention are (except for the inclusion of the steroid to be converted) the same as those of culturing various other bacteria for the production of organic acids or glycols, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose starch or dextrin), a fatty acid, a fat and/or the steroid itself. Preferably, however, the medium includes an assimilable source of carbon and energy in addition to the steroid. The source of nitrogenous factors may be organic (e.g. soybean meal, corn steep liquor, meat extract and/or distillers' solubles) or synthetic (i.e., composed of simple, synthesizable organic and inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation.

The process yields, inter alia, 1-dehydro-11α-hydroxy-progesterone and Δ$^{1,4}$-pregnadiene-11α,20β-diol-3-one, which are useful as intermediates in the preparation of 1-dehydro-11-ketoprogesterone. 1-dehydro-11-ketoprogesterone is a physiologically-active steroid which possesses progestational activity. Thus, it can be used in lieu of known progestational steroids, such as progesterone, in the treatment of menopausal disturbances, being formulated for such administration in the same type of preparations as progesterone, for example, with concentration and/or dosage based on the activity of the steroid. This conversion of the 11α-hydroxy steroids to 1-dehydro-11-keto-progesterone is effected by treatment of the steroid with chromic acid and sulfuric acid in an inert solvent (e.g. acetone and dioxane).

The following examples are illustrative of the invention (all temperatures being in centigrade):

EXAMPLE 1

*Preparation of 1-dehydro-11α-hydroxyprogesterone*

(a) FERMENTATION

Surface growth of a 3 week old agar slant of *Corynebacterium simplex* (American Type Culture Collection No. 6946), the slant containing as a nutrient medium (A)

|  | Grams |
|---|---|
| Beef extract | 1.5 |
| Yeast extract | 3.0 |
| Peptone | 6.0 |
| Glucose | 1.0 |
| Agar | 20 |
| Distilled water to 1 liter | | is suspended in 12 ml. of water. One-half ml. of suspension is used to inoculate 11 flasks each containing 50 ml. of the following medium (B):

| | | |
|---|---|---|
| Glucose | grams | 20 |
| Peptone | do | 5 |
| Tryptone | do | 5 |
| Yeast extract | do | 5 |
| CaCO$_3$ | percent | 0.25 |
| Distilled water to 1 liter. | | |

After 19 hours' incubation at 25° on a 280 cycle per minute 2-inch radius rotary shaker, 3% (vol./vol.) transfer is made to 94 flasks each with 100 ml. of the following medium: 0.1% glucose, 0.1% yeast extract, 0.1% KH$_2$PO$_4$, in distilled water adjusted to pH 7.0 before autoclaving 20 minutes at 120°. After 29 hours' incubation on a 120 cycle per minute 1.5 inch displacement reciprocating shaker, 9.4 g. of 11α-hydroxyprogesterone is added in 94 ml. of absolute methanol, 1 ml. per flask. After 22 hours' further incubation, 5 ml. of chloroform, 0.2 g. of powdered cellulose, and 0.05 ml. of 12 N sulfuric acid are added to each flask and the contents are shaken. Aqueous layers are decanted on to a Seitz filter pad. Chloroform layers are combined, passed through the pad, and the pads are then washed with several portions of chloroform. The volume of the aqueous layer is about 9695 ml. and that of the chloroform layer about 945 ml.

(b) ISOLATION OF 1-DEHYDRO-11α-HYDROXY-PROGESTERONE

The layers are separated and the aqueous layer is ex-extracted with four 3 liter portions of chloroform, and all the combined chloroform extracts evaporated to dryness in vacuo. The residue (about 2.8 g.) is crystallized from acetone, and yields about 750 mg. of crude crystalline 1-dehydro-11α-hydroxy-progesterone, which after additional crystallization from 95% alcohol has the following properties: M.P. 228–230°; $[\alpha]_D^{23}$ —93° (c., 0.43 in CHCl$_3$);

$\lambda_{max}^{alc}$ 246 m$\mu$; ($\epsilon$=18,100); $\lambda_{max}^{Nujol}$ 2.94$\mu$, 5.89$\mu$, 6.05$\mu$, 6.19$\mu$, 6.28$\mu$

*Analysis.*—Calc'd for C$_{21}$H$_{28}$O$_3$ (328.44): C, 76.79; H, 8.59. Found: C, 77.04; H, 8.36.

EXAMPLE 2

*Preparation of Δ$^{1,4}$-pregnadiene-11α,20β-diol-3-one*

(a) FERMENTATION

Surface growth of a 2 day old agar slant of *Corynebacterium simplex* (ATCC 6946), containing the same nutrient medium (A) as in Example 1, is suspended in 10 ml. of distilled water. One ml. of suspension is used to inoculate each of 8 flasks, each containing 50 ml. of the same medium (B) of Example 1. The flasks are incubated at 25° on a 280 cycle per minute 2-inch radius rotary shaker. After 19 hours a 5% (vol./vol.) transfer is made to 74 flasks each with 50 ml. of the same medium (B) as used before. After 24 hours, 925 mg. of 11α-hydroxyprogesterone is added in 37 ml. of absolute methanol, 0.5 ml. per flask. After 3 hours' exposure of steroid to the cells, the pH of each flask is adjusted from 6.7 to 3.2 with 12 N sulfuric acid. 0.1 g. of powdered cellulose is added to each flask as filter aid. The contents of the flasks are filtered through a Seitz clarifying pad which is then washed with 10% $H_2O$. The combined filtrate and washings is about 3670 ml.

(b) ISOLATION OF $\Delta^{1,4}$-PREGNADIENE-11α,20β-DIOL-3-ONE

The culture filtrate from part $a$ is extracted with four 1 liter portions of chloroform and the chloroform extracts combined and concentrated to dryness in vacuo. The residue (about 1.01 g.) is crystallized from acetone and furnishes about 530 mg. of $\Delta^{1,4}$-pregnadiene-11α,20β-diol-3-one, which after additional recrystallization from acetone has the following properties: M.P. 227–229°; $[\alpha]_D^{23}$ +41° (c., 0.52 in chloroform);

$$\lambda_{max}^{alc} \ 247 \ m\mu \ (\epsilon = 18,400)$$

*Analysis.*—Calc'd for $C_{21}H_{30}O_3$ (330.46): C, 76.32; H, 9.15. Found: C, 76.61; H, 8.68.

EXAMPLE 3

*Preparation of 1-dehydro-11-ketoprogesterone*

To a solution of 100 mg. of 1-dehydro-11α-hydroxyprogesterone in 10 ml. of reagent grade acetone is added at room temperature with stirring 0.1 ml. of a solution of 200 mg. of chromic acid and 320 mg. of sulfuric acid in 1 ml. of water. After 15 minutes, a few drops of alcohol are added and the mixture diluted with water. After removal of the acetone in vacuo, the residual mixture is extracted with chloroform, the chloroform extract washed with water, dilute sodium bicarbonate and water, dried over sodium sulfate and evaporated to dryness in vacuo. The residue (about 96 mg.), after recrystallization from acetone-hexane, furnished pure 1-dehydro-11-ketoprogesterone of the following properties: M.P. 170–172°; $[\alpha]_D^{23}$ −223° (c., 0.62 in chloroform);

$\lambda_{max}^{alc}$ 238 m$\mu$ ($\epsilon$=15,300); $\lambda_{max}^{Nujol}$ 5.86$\mu$, 5.99$\mu$, 6.14$\mu$, 6.23$\mu$

*Analysis.*—Calc'd for $C_{21}H_{28}O_3$ (326.42): C, 77.27; H, 8.03. Found: C, 77.40; H, 8.15.

EXAMPLE 4

*Preparation of 1-dehydro-11-ketoprogesterone*

By following the procedure of Example 3, but substituting 100 mg. of $\Delta^{1,4}$-pregnadiene-11α,20β-diol-3-one for the 1-dehydro-11α-hydroxyprogesterone and using 0.2 ml. of the chromic acid solution, 1-dehydro-11-ketoprogesterone of the above properties is obtained.

The invention may be variously otherwise embodied within the scope of the appended claim.

We claim:

$\Delta^{1,4}$-pregnadiene-11α,20β-diol-3-one.

References Cited in the file of this patent

UNITED STATES PATENTS

| | | |
|---|---|---|
| 2,345,711 | Marker | Apr. 4, 1944 |
| 2,350,792 | Miescher et al. | June 6, 1944 |
| 2,676,181 | Hanze | Apr. 20, 1954 |
| 2,756,179 | Fried et al. | July 24, 1956 |
| 2,769,822 | Cash | Nov. 6, 1956 |

OTHER REFERENCES

Nobile et al.: J.A.C.S., vol. 77, page 4184 (August 5, 1955).

Vischer et al.: Helv. Chim. Acta, vol. 38, pages 834–840 (1955).